(12) United States Patent
Kariu et al.

(10) Patent No.: US 11,468,184 B2
(45) Date of Patent: Oct. 11, 2022

(54) DATA PROTECTION SYSTEM, DATA PROTECTION METHOD, AND RECORDING MEDIUM

(71) Applicants: Kyushu Electric Power Co., Inc., Fukuoka (JP); Humming Heads, Inc., Tokyo (JP)

(72) Inventors: Daijiro Kariu, Fukuoka (JP); Naoyuki Oe, Tokyo (JP); Haruo Iwasaki, Fukuoka (JP); Takahiro Shima, Tokyo (JP)

(73) Assignees: KYUSHU ELECTRIC POWER CO., INC., Fukuoka (JP); HUMMING HEADS, INC., Tokyo (JP)

(*) Notice: Subject to any disclaimer, the term of this patent is extended or adjusted under 35 U.S.C. 154(b) by 139 days.

(21) Appl. No.: 16/638,938

(22) PCT Filed: Aug. 7, 2018

(86) PCT No.: PCT/JP2018/029601
§ 371 (c)(1),
(2) Date: Feb. 13, 2020

(87) PCT Pub. No.: WO2019/035393
PCT Pub. Date: Feb. 21, 2019

(65) Prior Publication Data
US 2020/0226273 A1    Jul. 16, 2020

(30) Foreign Application Priority Data
Aug. 17, 2017 (JP) .............................. JP2017-157630

(51) Int. Cl.
*G06F 21/62*        (2013.01)
*G06F 21/78*        (2013.01)

(52) U.S. Cl.
CPC .......... *G06F 21/62* (2013.01); *G06F 21/6218* (2013.01); *G06F 21/78* (2013.01)

(58) Field of Classification Search
CPC ................... G06F 21/60–629; G06F 21/78
See application file for complete search history.

(56) References Cited

U.S. PATENT DOCUMENTS

2010/0106698 A1* 4/2010 Nakayama ............ G06F 16/113
                                                     707/705
2014/0082717 A1* 3/2014 Kang ...................... G06F 21/53
                                                     726/9
(Continued)

FOREIGN PATENT DOCUMENTS

JP    2007172063 A    7/2007
JP    2008234140 A    10/2008
(Continued)

OTHER PUBLICATIONS

Yasuhiro Kirihata, Yoshiki Sameshima and Takashi Onoyama, "WriteShield: A pseudo thin-client system for prevention of information leakage," 2010 8th IEEE International Conference on Industrial Informatics, 2010, pp. 478-483, doi: 10.1109/INDIN.2010.5549695. (Year: 2010).*

(Continued)

*Primary Examiner* — Madhuri R Herzog
(74) *Attorney, Agent, or Firm* — Lucas & Mercanti, LLP (57) ABSTRACT

A data protection system includes a data storage apparatus and an information processing apparatus. In the information processing apparatus, a redirection processing apparatus sets a personal storage area corresponding to a user to an accessible state according to a redirection policy. Furthermore, a write control unit controls data writing permission/prohibition for each storage area according to a write management policy. In particular, the write control unit prohibits data writing to a local storage unit except for the storage area to be used to access the personal storage area. With this, the data does not remain in the information processing apparatus, thereby preventing data leakage from the information processing apparatus.

7 Claims, 5 Drawing Sheets

(56) References Cited

U.S. PATENT DOCUMENTS

2016/0350530 A1\* 12/2016 Wang .................. G06F 3/0644
2016/0378782 A1 12/2016 Jiang et al.

FOREIGN PATENT DOCUMENTS

| JP | 2011008813 A | \* | 1/2011 | ......... G06F 12/0866 |
| JP | 2012113760 A | | 6/2012 | |
| JP | 2017010424 A | | 1/2017 | |
| KR | 100740682 B1 | \* | 7/2007 | ............. G06F 21/78 |

OTHER PUBLICATIONS

EPO, Extended European Search Report for the corresponding European application No. 18845860.8, dated Apr. 9, 2021.
Nick Cavalancia, "Virtualizing the Desktop with ScriptLogic Desktop Authority," Jan. 1, 2009, ScriptLogic, Retrieved from:http://www.servaplex.com/sites/default/files/pdf/Virtualizing-the-Desktop-with-Scriptlogic-Desktop-Authority.pdf.
Why Does VDI Introduction Fail?; URL:http://jpn.nec.com/esemi/dtvsol.
Management of user profile using folder redirection; URL:http://www.atmarkit.co.jp/ait/articles/1510/08/news019.html.
International Search Report dated Sep. 25, 2018 for PCT/JP2018/029601 and English translation.

\* cited by examiner

DATA PROTECTION SYSTEM, DATA PROTECTION METHOD, AND RECORDING MEDIUM

CROSS REFERENCE TO RELATED APPLICATION

This Application is a 371 of PCT/JP2018/029601 filed on Aug. 7, 2018 which, in turn, claimed the priority of Japanese Patent Application No. 2017-157630 filed on Aug. 17, 2017, both applications are incorporated herein by reference.

TECHNICAL FIELD

The present invention relates to a data protection system, a data protection method, and a recording medium. In particular, the present invention relates to a data protection system or the like including an information processing apparatus and a data storage apparatus.

BACKGROUND ART

Recently, awareness with respect to security against data leakage or the like due to data stored in a client has been growing. For example, a virtual desktop is supported by a server using desktop virtualization (VDI) so as to allow the user to not use client local storage (e.g., a storage unit (hard disk included in a personal computer) included in an information processing apparatus to be operated by a staff member). This is a countermeasure that allows data not to remain in such client local storage (see Non-patent document 1 or the like).

Also, in order to allow a user to use the same profile even if the user logs on from any computer, an arrangement has been known in which data is centrally managed by a server using a folder redirection technique (see Non-patent document 2 or the like).

CITATION LIST

Patent Literature

[Non-Patent Document]
[Non-Patent Document 1]
"Why does VDI introduction fail?" [online] Internet <URL: http://jpn.nec.com/esemi/dtvsol/>
[Non-Patent Document 2]
"Management of user profile using folder redirection" [online] Internet <URL:http://www.atmarkit.co.jp/ait/articles/1510/08/news019.html>

SUMMARY OF INVENTION

Technical Problem

However, as described in Non-patent document 1, VDI supports the central management of a program execution environment in addition to supporting the central management of data. Accordingly, a dedicated server is required to have a very high processing capacity, which requires enormous introduction costs and maintenance costs.

With the folder redirection technique described in Non-patent document 2, a client is allowed to perform ordinary data operations for both a redirected storage area and local storage that has not been redirected. Accordingly, this allows the user to store data in local storage that has not been redirected, for example. That is to say, such a server is not capable of supporting sufficient data management.

Accordingly, it is a purpose of the present invention to provide a data protection system or the like that supports information processing effectively using client hardware resources while not storing data in the client.

Solution of Problem

A first aspect of the present invention relates to a data protection system comprising an information processing apparatus and a data storage apparatus. The information processing apparatus comprises: a redirection processing unit; a write control unit; and a local storage unit. In a case in which the information processing apparatus is able to communicate with the data storage apparatus, the redirection processing unit permits a user of the information processing apparatus to access data stored in the data storage apparatus. In this case, when data writing is requested according to an instruction from the user of the information processing apparatus, the write control unit permits a process executed in the information processing apparatus to write such data to the data storage apparatus, and prohibits such a process from writing such data to the local storage unit. In this case, when data writing is requested without an instruction from the user of the information processing apparatus, the control unit permits such a process to perform a part of or all of such data writing to the data storage apparatus and the local storage unit. In a case in which the information processing apparatus is not able to communicate with the data storage apparatus, when data writing is requested according to an instruction from the user of the information processing apparatus, the write control unit prohibits a process executed in the information processing apparatus from performing such data writing to the local storage unit.

A second aspect of the present invention relates to the data protection system according to the first aspect. The data protection system comprises a policy storage unit configured to store a write management policy. The write management policy is configured to be capable of identifying a process prohibited from writing data to the local storage unit. The process prohibited from writing data to the local storage unit includes a process for performing data writing processing according to an instruction from the user of the information processing apparatus. In a case in which the information processing apparatus is able to communicate with the data storage apparatus, and when a given process is specified by the write management policy as a process prohibited from writing data to the local storage unit, the write control unit permits the process to write data to the data storage apparatus, and prohibits the process from writing data to the local storage unit. In this case, when a given process is not specified by the write management policy as such a process that is prohibited from writing data to the local storage unit, the write control unit permits this process to write data to the data storage apparatus and the local storage unit. This arrangement is capable of preventing data writing to the local storage unit from being performed according to an instruction from the user of the information processing apparatus.

A third aspect of the present invention relates to the data protection system according to the first or second aspect. In a case in which the information processing apparatus is not able to communicate with the data storage apparatus, the write control unit permits a process executed in the information processing apparatus to write data to an external storage apparatus that differs from both the data storage apparatus and the local storage unit.

A fourth aspect of the present invention relates to the data protection system according to the first or second aspect. The information processing apparatus is capable of accessing data stored in the local storage unit using a local position representation. In a case in which the information processing apparatus is able to communicate with the data storage apparatus, the redirection processing unit allows the user of the information processing apparatus to access data stored in the data storage apparatus using a redirection position representation specified as a part of the local position representation. In this case, when data writing is requested according to an instruction from the user of the information processing apparatus, the write control unit permits such data to be written to a position specified in the data storage apparatus that is accessible using the redirection position representation, and prohibits such data from being written to a position specified in the local storage unit that is accessible using a local position representation that is not specified as a redirection position representation. In a case in which the information processing apparatus is not able to communicate with the data storage apparatus, when data writing is requested according to an instruction from the user of the information processing apparatus, the write control unit prohibits such data from being written to a position specified in the local storage unit that is accessible using the local position representation.

A fifth aspect of the present invention relates to the data protection system according to any one of the first aspect through the fourth aspect. The information processing apparatus comprises a policy storage unit. The data storage apparatus manages a personal storage area that corresponds to the user of the information processing apparatus. The policy storage unit stores: a redirection policy to be used to identify the personal storage area that corresponds to the user of the information processing apparatus; and a write management policy to be used to identify a position to which data writing is permitted and/or a position to which data writing is prohibited with respect to data writing corresponding to the user of the information processing apparatus. In a case in which the information processing apparatus is able to communicate with the data storage apparatus, the redirection processing unit sets the personal storage area that corresponds to the user of the information processing apparatus to an accessible state using the redirection policy. In this case, the write control unit performs data writing control using the write management policy with respect to data writing corresponding to the user of the information processing apparatus.

A sixth aspect of the present invention relates to the data protection system according the fifth aspect. The write management policy is configured to manage the user of the information processing apparatus, processes for which data writing in the information processing apparatus is permitted and/or prohibited, and storage areas for which data writing is permitted and/or prohibited, such that they are associated with each other. In a case in which the information processing apparatus is able to communicate with the data storage apparatus, the write control unit controls so as to judge whether or not data writing is to be permitted or prohibited using the write management policy that corresponds to the user of the information processing apparatus based on information with respect to a combination of the user of the information processing apparatus, the process that is to write data, and the storage area to which the data is to be written.

A seventh aspect of the present invention relates to a data protection system comprising an information processing apparatus and a data storage apparatus. The information processing apparatus comprises a redirection processing unit, a write control unit, and a local storage unit. When data writing to the local storage unit is requested according to an instruction from a user of the information processing apparatus, the write control unit prohibits the data writing. When data writing to the local storage unit is requested without an instruction from the user of the information processing apparatus, the write control unit permits a part of or all of the data writing. In a case in which the information processing apparatus is able to communicate with the data storage apparatus, the redirection processing unit allows the user of the information processing apparatus to access data stored in the data storage apparatus. In this case, the write control unit permits a process executed in the information processing apparatus to write data to the data storage apparatus regardless of whether or not data writing is requested according to an instruction from the user.

An eighth aspect of the present invention relates to a data protection system comprising a data storage apparatus and an information processing apparatus configured to control a device. The data storage apparatus manages use information with respect to the device. The information processing apparatus comprises a control unit, a redirection processing unit, a write control unit, and a local storage unit. In a case in which the information processing apparatus is able to communicate with the data storage apparatus, the redirection processing unit allows the information processing apparatus to access the user information with respect to the device managed by the data storage apparatus. In this case, the write control unit permits a process configured to write information that can be used to identify the user of the device to write data to the use information with respect to the device managed by the data storage apparatus, and prohibits such a process from writing data to the local storage unit. In this case, the write control unit permits a part of or all of the processes each configured not to write information that can be used to identify the user of the device to write data to the use information with respect to the device managed by the data storage apparatus and the local storage unit. In this case, the control unit controls the device using the use information with respect to the device managed by the data storage apparatus. In a case in which the information processing apparatus is not able to communicate with the data storage apparatus, the write control unit prohibits writing of information that can be used to identify the user of the device to the local storage unit. In this case, the control unit controls the device using data stored in the local storage unit.

A ninth aspect of the present invention relates to a data protection method employed in a data protection system comprising an information processing apparatus and a data storage apparatus. The information processing apparatus comprises a redirection processing unit, a write control unit, and a local storage unit. In a case in which the information processing apparatus is able to communicate with the data storage apparatus, the redirection processing unit allows a user of the information processing apparatus to access data stored in the data storage apparatus. In this case, when data writing is requested according to an instruction from the user of the information processing apparatus, the write control unit permits a process executed in the information processing apparatus to perform the data writing to the data storage apparatus, and prohibits such a process from performing the data writing to the local storage unit. In this case, when data writing is requested without an instruction from the user of the information processing apparatus, the write control unit permits such a process to perform a part of or all of the data writing to the data storage apparatus and the local storage unit. In a case in which the information processing apparatus is not able to communicate with the data storage apparatus, when data writing is requested according to an instruction from the user of the information processing apparatus, the write control unit prohibits a process executed in the information processing apparatus from performing the data writing to the local storage unit.

A tenth aspect of the present invention relates to a computer-readable recording medium that records a program configured to cause a computer to function as the write control unit in the data protection system according to any one of the first aspect through the seventh aspect.

Advantageous Effects of Invention

With each aspect of the present invention, the data storage apparatus which differs from the information processing apparatus is capable of centrally managing data. With such an arrangement, using the folder redirection technique or the like, the user of each information processing apparatus is able to use the data stored in the data storage apparatus regardless of the information processing apparatus that is being used by the user. In addition to a data managing mechanism supported by the data storage apparatus, writing control is performed for each information processing apparatus. Such an arrangement allows data to be handled without the data remaining in the information processing apparatus, thereby providing a high security level.

In particular, with the fourth aspect of the present invention, in a case in which the user of the information processing apparatus requests access to the data storage apparatus using the same path as that to be used to access the local storage using the folder redirection method or the like, this arrangement is capable of permitting access to the data storage apparatus and of prohibiting access to the local storage even if the same path is used. With the folder redirection technique or the like, in many cases, a user tends to leave data in a folder that is not specified as a redirected folder or the like. However, no mechanism is supported for prohibiting such an instruction from the user. With the present invention, data writing to the local storage according to a path that has not been specified as a redirected path is prohibited. This supports data handling without involving user data remaining in the local storage.

At present, an enormous amount of data is collected regardless of time and location. At present, prevention of data leakage or the like is not only a problem in organizational units, but has become an important problem that is to be solved for protecting community trust. With the present invention, unlike VDI, a program or the like can be executed using hardware resources of the information processing apparatus. Accordingly, there is no need to introduce high-level hardware resources such as a dedicated server or the like, thereby allowing the data protection system to be installed with low costs. Accordingly, such a system can be introduced to a large number of companies in the community. In addition to the individual company units, this contributes to building the trust of the overall community. The present applicants have been working to support the community for many years, and have earned the trust of the community. The present invention is applicable to providing a contribution to building trust with respect to data in the overall community by reflecting the track record of contributions to the community made by the present applicants.

Furthermore, with the fifth aspect of the present invention, in addition to the redirection policy used in the folder redirection or the like, the write management policy is used. This allows data to be centrally managed for each user in a simple manner without involving data remaining in the information processing apparatus regardless of whether all of the local user profile is redirected, or a part of the local user profile is redirected or the like.

Furthermore, with the sixth aspect of the present invention, in addition to the process, the data writing is managed according to the write management policy, thereby providing data writing control in a flexible manner. For example, in a case in which a given process is configured to perform data writing according to a data writing instruction from the user (e.g., change or deletion of existing data, creation of new data, etc.), the write management policy restricts the data writing operation of such a process to the local storage unit. This allows the data writing to the local storage unit according to an instruction from the user to be restricted. Furthermore, such an arrangement is capable of supporting a countermeasure against unintended data writing to the personal storage area due to a computer virus or the like. Furthermore, such an arrangement is capable of avoiding a reduction of the security level due to the user independently installing a program in the information processing apparatus.

Furthermore, with the eighth aspect of the present invention, in the technical field of the IoT or the like, after the device is replaced, data such as the use information can be used. Furthermore, by managing the data used to control the device without the data remaining in the device as much as possible, this arrangement is capable of preventing the leakage of personal information when the device is discarded or is sold second-hand.

DESCRIPTION OF EMBODIMENTS

Description will be made regarding an example of the present invention with reference to the drawings. It should be noted that the present invention is not restricted to such an example.

EXAMPLE

FIG. 1A is a diagram showing an example configuration of a data storage apparatus 1 included in a data protection system according to an example of the present invention. FIG. 1B is a diagram showing an example configuration of a policy management apparatus 9 included in the data protection system. FIG. 1C is a diagram showing an example configuration of an information processing apparatus 21 included in the data protection system. The information processing apparatus 21 is configured as a personal computer or the like. There are multiple information processing apparatuses 21 in the data protection system. For example, a staff member of a company logs in and uses any one of the information processing apparatuses 21. In the description below, it is assumed that a user A logs in and uses the information processing apparatus 21.

Referring to FIG. 1A, the data storage apparatus 1 includes a communication unit 3, a control unit 5, and a personal storage area storage unit 7.

The personal storage area storage unit 7 manages the personal storage area for each of the users of the information processing apparatuses 21 (e.g., staff members of the company). FIG. 1A shows an example in which the personal storage area storage unit 7 manages a personal storage area $8_1$ of a user A, a personal storage area $8_2$ of a user B, and the like.

The communication unit 3 communicates with the information processing apparatus 21. Upon receiving a data read request or a data write request from the information processing apparatus 21, the control unit 5 reads/writes data from/to the personal storage area that corresponds to the user of the information processing apparatus 21.

Referring to FIG. 1B, the policy management apparatus 9 includes a communication unit 10, a policy management unit 11, and a write management policy storage unit 12.

The write management policy storage unit 12 stores a write management policy that defines a combination of one or multiple processes that are to be executed in the information processing apparatus 21 such that they are permitted to write data and folders to which data can be written, with respect to data writing that corresponds to each user of the information processing apparatus 21. For example, the write management policy may be designed to define the processes that are permitted to write data, which thus defines other processes as processes in which data writing is prohibited. Similarly, the write management policy may be designed to define the processes that are not permitted to write data, for example, which thus defines other processes as processes in which data writing is permitted. The same can be said of the folders.

The communication unit 10 communicates with the information processing apparatus 21. Examples of processing supported by the policy management unit 11 include: management (addition, change, deletion) of the write management policy according to an instruction from the system manager; distribution of the write management policy to the information processing apparatus 21; and the like.

Referring to FIG. 1C, the information processing apparatus 21 includes a communication unit 23, an input unit 25, a redirection processing unit 27, a policy setting unit 29, a write control unit 31, a control unit 33, a mounting unit 35, a policy storage unit 37, and a local storage unit 39. An external storage apparatus 49 (e.g., SD card, USB memory, or the like) is detachably mounted on the mounting unit 35 such that it can be easily detached.

The communication unit 23 communicates with the data storage apparatus 1 and the policy management apparatus 9. The input unit 25 is configured as a keyboard, mouse, touch panel, or the like, which allows the user of the information apparatus 21 to input a log-in instruction, to designate the data to be subjected to information processing, etc. The local storage unit 39 includes a program storage unit 47 that stores programs that can be executed in the information processing apparatus 21. Unlike VDI, the information processing apparatus 21 is configured to execute the programs stored in the program storage unit 47 so as to effectively use the hardware resources of the information processing apparatus 21. When the operating system or the like is to be updated, an operation such as a upgrading operation or the like may be preferably performed for each information processing apparatus 21.

When the user A logs in, the policy setting unit 39 sets the policy of the user A for the policy storage unit 37. The policy includes a redirection policy 43 for folder redirection supported by the redirection processing unit 27 and a write management policy 45 for data writing control supported by the write control unit 31. With the present example, the redirection policy 43 is designed to support folder redirection of the personal storage area $8_1$ for the user A with respect to a part of or all of the user profile of the user A. The policy setting unit 29 downloads the write management policy $13_1$ of the user A managed by the write management policy storage unit 12 of the policy management apparatus 9, and overwrites the previous write management policy 45 with the write management policy $13_1$ thus downloaded, thereby setting the write management policy.

The information processing apparatus 21 performs folder redirection for the personal storage area 8 using the redirection policy 43. Furthermore, the information processing apparatus 21 controls writing of data to the personal storage area 8, local storage unit 39, or the like, using the write management policy 45.

With the write management policy 45, the processes to be executed in the information processing apparatus 21 in which data writing is restricted and the storage areas that allow data writing corresponding to each process are managed such that they are associated with each other with respect to data writing that corresponds to the user of the information processing apparatus 21. For example, this arrangement permits the processes, which are each configured to write data according to an instruction of the user, to write data to a part of or all of the personal storage area $8_1$, and prohibits data writing to the local storage unit 39. Furthermore, in a case in which the data to be written by a given process to the local storage unit 39 has no relation with the content input by the user, this arrangement does not restrict the data writing area of the local storage unit 39 to which data is to be written by the process. That is to say, such an arrangement allows the process to write data to the local storage unit 39 in addition to the personal storage area $8_1$. In a case in which the data has a relation with the content input by the user, this arrangement is capable of restricting the data writing operation of each process so as to prohibit such data from being written to the local storage unit 39, thereby preventing data leakage from the local storage unit 39. It should be noted that, even in a case in which a given process is configured as with the second process described above, such an arrangement may set a necessary minimum storage area to which data writing is permitted, configured as a part of the personal storage area $8_1$ or a part of the local storage unit 39.

It should be noted that the write management policy 45 may be managed such that the writing operation of each process is restricted in a so-called blacklist method as described above. Also, the write management policy 45 may be managed such that the writing operation of each process is permitted in a so-called whitelist method as described above. With the whitelist method, in a case in which the write management policy does not restrict the data writing operation of a given process, the process is permitted to write data to both the personal storage area $8_1$ and the local storage unit 39. In a case in which the processes are managed according to such a whitelist method regarding whether or not each process is permitted to write data, this arrangement provides a countermeasure for user-unintended data writing to the personal storage area due to a computer virus or the like. Furthermore, this arrangement is capable of avoiding a reduction of the security level due to the user independently installing a program in the information processing apparatus 21.

Also, an arrangement may be made employing a combination of the blacklist method and the whitelist method. For example, the whitelist method is employed for the personal storage area $8_1$. Specifically, processes other than those listed in the write management policy are prohibited from writing data, thereby protecting the data stored in the personal storage area $8_1$ from unintended data writing due to a computer virus or the like. On the other hand, the blacklist method is employed for the local storage unit 39. Processes listed in the write management policy are prohibited from data writing, thereby preventing data leakage or the like from the local storage unit 39.

For simplification of description, description will be made below regarding an arrangement employing the blacklist method. Specifically, in a case in which a given process is included in the write management policy 45, such an arrangement allows this process to access only folders for accessing the personal storage area $8_1$ for the user A (a position representation (path) for identifying such a folder is an example of a "redirection position representation" in the present claims), and prohibits this process from writing data to the other folders.

The redirection processing unit 27 assigns the personal storage area $8_1$ of the user A of the data storage apparatus 1 to a part of the folders that can be accessed by the information processing apparatus 21 using the redirection policy 43 based on the folder redirection technique or the like, for example, so as to allow the user A to use the data stored in the personal storage area $8_1$.

The write control unit 31 performs a data writing control operation using the write management policy 45 according to an instruction from the user A.

The control unit 33 controls the operation of the information processing apparatus 21 by executing a program or the like stored in the program storage unit 47.

Figure 1:
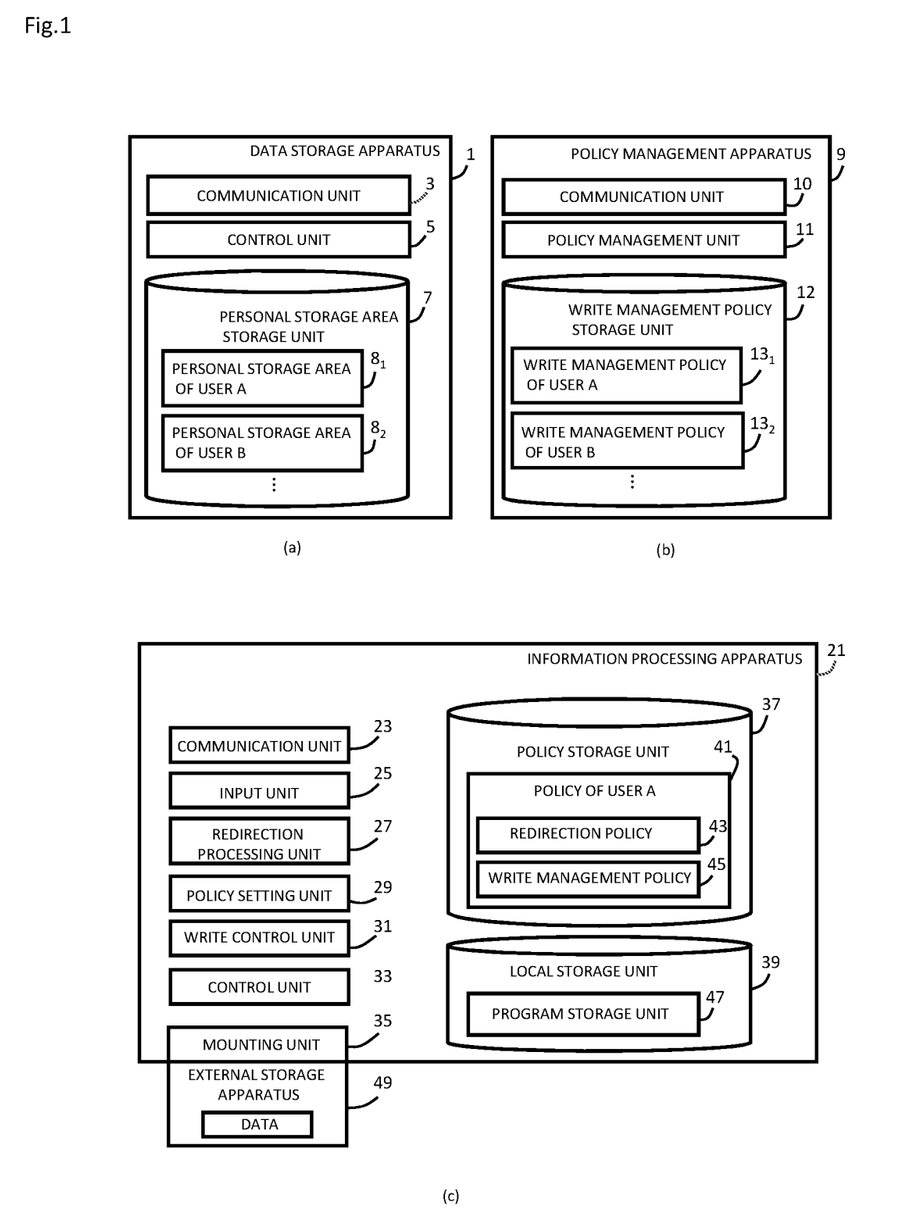
FIG. 1A is a block diagram showing an example configuration of a data storage apparatus 1 included in a data protection system according to an example of the present invention.
FIG. 1B is a block diagram showing an example configuration of a policy management apparatus 9 thereof.
FIG. 1C is a block diagram showing an example configuration of an information processing apparatus 21 thereof.
Figure 2:
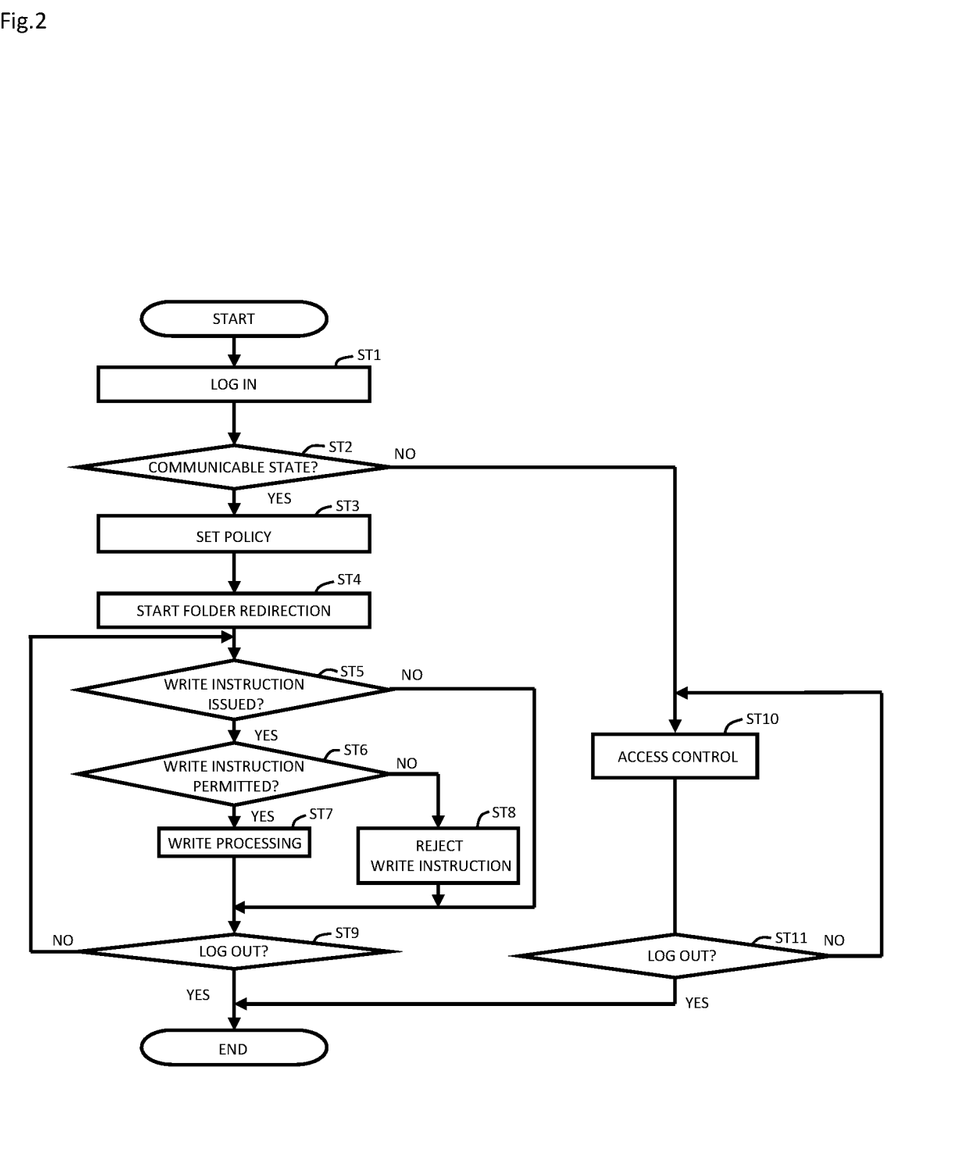
FIG. 2 is a flowchart showing an example of the operation of the data protection system shown in FIG. 1.

FIG. 2 is a flowchart showing an example of the operation of the data protection system shown in FIG. 1. Description will be made with reference to FIG. 2 regarding an example of the operation of the data protection system shown in FIG. 1.

The control unit 33 of the information processing apparatus 21 allows the user to log in to the information processing apparatus 21 by operating the input unit 25 (Step ST1). The control unit 33 performs processing that corresponds to the logged-in user. Description will be made below regarding an example in which the logged-in user is the user A.

Subsequently, the policy setting unit 29 judges whether or not the communication unit 23 is able to communicate with the data storage apparatus 1 and the policy management apparatus 9 (Step ST2). When judgment has been made that the communication can be performed, the flow proceeds to Step ST3. Otherwise, the flow proceeds to Step ST10.

In Step ST3, the policy setting unit 29 sets the redirection policy 43 for defining the folder redirection to the personal storage area $8_1$ of the user A. Furthermore, the policy setting unit 29 requests the policy management unit 11 to download the write management policy $13_1$ for the user A stored in the write management policy storage unit 12, so as to set the write management policy 45 (Step ST3).

The redirection processing unit 27 enables the information processing apparatus 21 to access the personal storage area $8_1$ of the user A via a folder specified by the redirection position representation using the redirection policy 43 based on the folder redirection technique (Step ST4).

The user A is able to read the data stored in the personal storage area $8_1$ of the user A and to perform processing of the data thus read using the programs stored in the program storage unit 47 of the local storage unit 39.

The write control unit 31 judges whether or not a process has issued an instruction to write data (Step ST5). When judgement has been made that a process has issued an instruction to write data, the flow proceeds to Step ST6.

In Step ST6, the write control unit 31 judges whether or not the data writing instruction is issued by a process that is not included in the write management policy 45, and whether or not the data writing instruction issued by the process is an instruction to write data to a folder included in the write management policy 45 as a folder for which data writing is permitted. When judgment is made that the data writing instruction is by a process that is not included in the write management policy 45, the data writing is performed. That is to say, when such a process issues an instruction to write data to a folder in the local storage unit 39, the data is written to the local storage unit 39. When such a process issues an instruction to write data to a folder of the personal storage area $8_1$ of the user A, the data storage apparatus 1 is requested to write the data. When judgement has been made that the data writing instruction is issued by a process included in the write management policy 45 so as to write data to a folder for which data writing is permitted, the data writing is performed. Specifically, the data storage apparatus 1 is requested to write data to the personal storage area $8_1$ of the user A (Step ST7), following which the flow proceeds to Step ST9. Conversely, when judgment has been made that the data writing instruction is an instruction to write data to a folder for which data writing is not permitted, the data writing request is rejected (Step ST8), following which the flow proceeds to Step ST9. In Step ST9, the control unit 33 judges whether or not the user A has made an instruction to log out. When judgment has been made that the user A has made an instruction to log out, the log-out processing is performed, and the operation ends. Otherwise, the flow returns to Step ST5.

Step ST10 shows an operation proceeding from Step ST2 in a situation in which the information processing apparatus 21 is not able to communicate with the data storage apparatus 1 and/or the policy management apparatus 9. Unlike VDI, with the present example, the information processing apparatus 21 is capable of using the programs stored in the program storage unit 47 of the local storage unit 39.

The control unit 33 performs processing such as an addition of data required to execute a program or a change of such data. The write control unit 31 prohibits the user A from writing data to the local storage unit 39, and permits the user A to write data to the external storage apparatus 49, for example. For example, the policy setting unit 29 may set a write management policy 45 that prohibits the user A from writing data to the local storage unit 39, and permits the user A to write data to the external storage apparatus 49. Also, the write control unit 31 may control the data writing according to the write management policy.

This allows the user A of the information processing apparatus 21 to perform an operation such as a storage operation in which a meeting memo exchanged with a business partner is stored in the external storage apparatus 49 while showing a demonstration to the business partner using data stored in the external storage apparatus 49, for example. With this arrangement, the data generated by the user A does not remain in the local storage unit 39, thereby preventing data leakage from the information processing apparatus 21. Also, the external storage apparatus 49 may be encrypted and may be managed as a separate apparatus from the information processing apparatus 21. This allows a security level that differs from that applied to the local storage unit 39 to be set for the external storage apparatus 49.

In Step ST11, the control unit 33 judges whether or not the user A has issued an instruction to log out. When judgement has been made that the user A has issued such an instruction to log out, the control unit 33 performs log-out processing, following which the operation ends. Otherwise, the access control operation is continued in Step S10.

Figure 3:
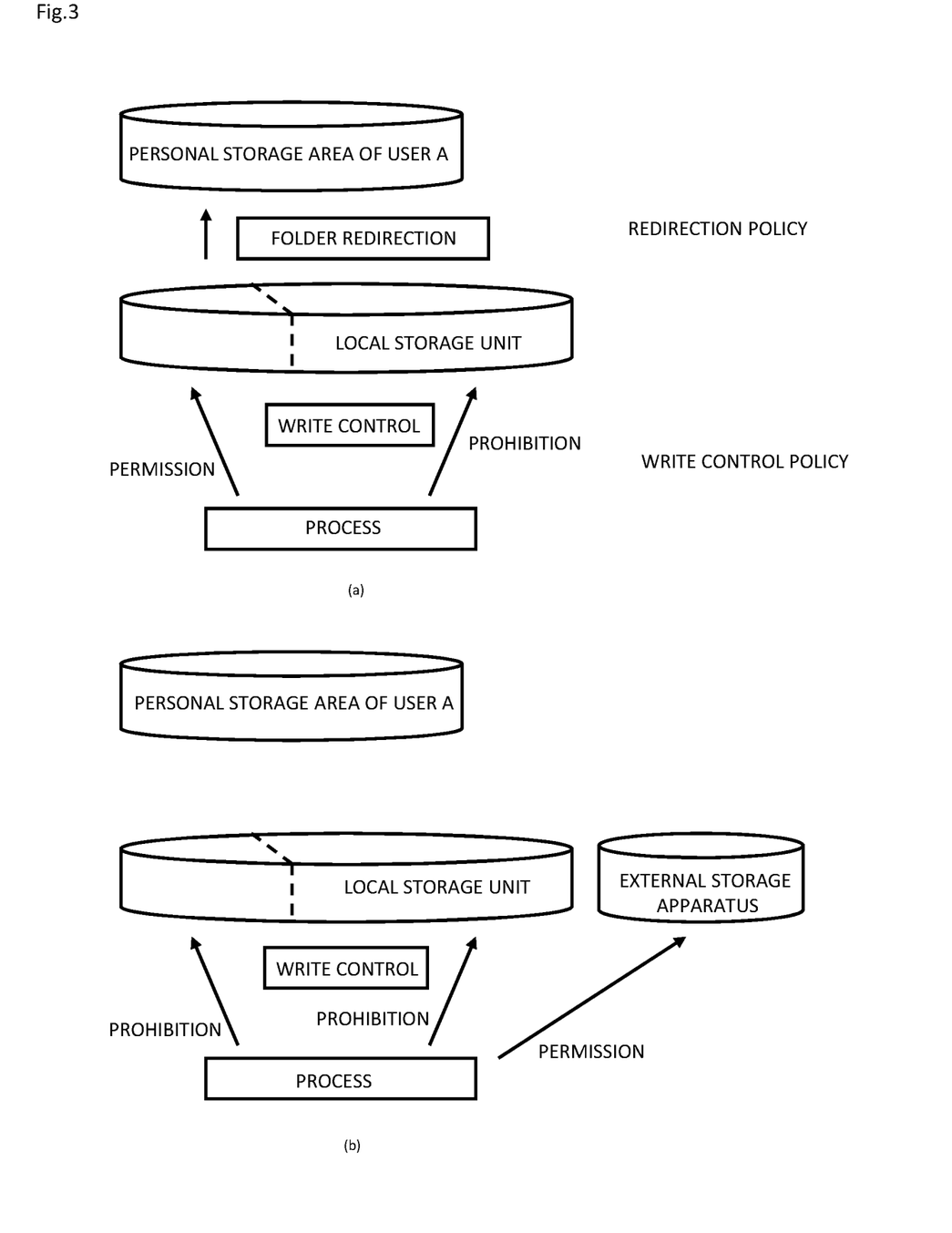
FIG. 3 shows an example of writing control supported by the data protection system shown in FIG. 1.

Description will be made regarding an example of data writing control supported by the data protection system shown in FIG. 1. FIG. 3A shows a case in which the information processing apparatus 21 is able to communicate with the data storage apparatus 1. FIG. 3B shows a case in which the information processing apparatus 21 is not able to communicate with the data storage apparatus 1. This arrangement allows the data stored in the local storage unit to be accessed via a folder specified by the local position representation. The redirection position representation is specified as a part of the local position representation. In a case in which a given process is configured to execute data writing according to an instruction from the user, the control operation shown in FIG. 3 is performed for this process. In a case in which a given process is configured to operate without involving the execution of data writing according to an instruction from the user, the process is permitted to write data.

Referring to FIG. 3A, in a case in which the information processing apparatus 21 and the data storage apparatus 1 are able to communicate with each other, this arrangement allows the information processing apparatus 21 to access the personal storage area of the user A via a folder specified by the redirection position representation based on the folder redirection using the redirection policy. With such an arrangement, in a case in which a given process is configured to execute data writing according to an instruction from the user, the writing control is performed for such a process using the write management policy. Specifically, the process is permitted to write data to the folders specified by the redirection position representation. Furthermore, the process is prohibited from writing data to a folder specified by the local position representation other than that used as the redirection position representation.

Referring to FIG. 3B, in a case in which the information processing apparatus 21 and the data storage apparatus 1 are not able to communicate with each other, the information processing apparatus 21 is not able to access the personal storage area of the user A. Accordingly, in a case in which a given process is configured to execute data writing according to an instruction from the user, the process is prohibited from writing data to the folders specified by the local position representation including the folders specified by the redirection position representation. With the present example, such a process is permitted to write data to the external storage apparatus.

Figure 4:
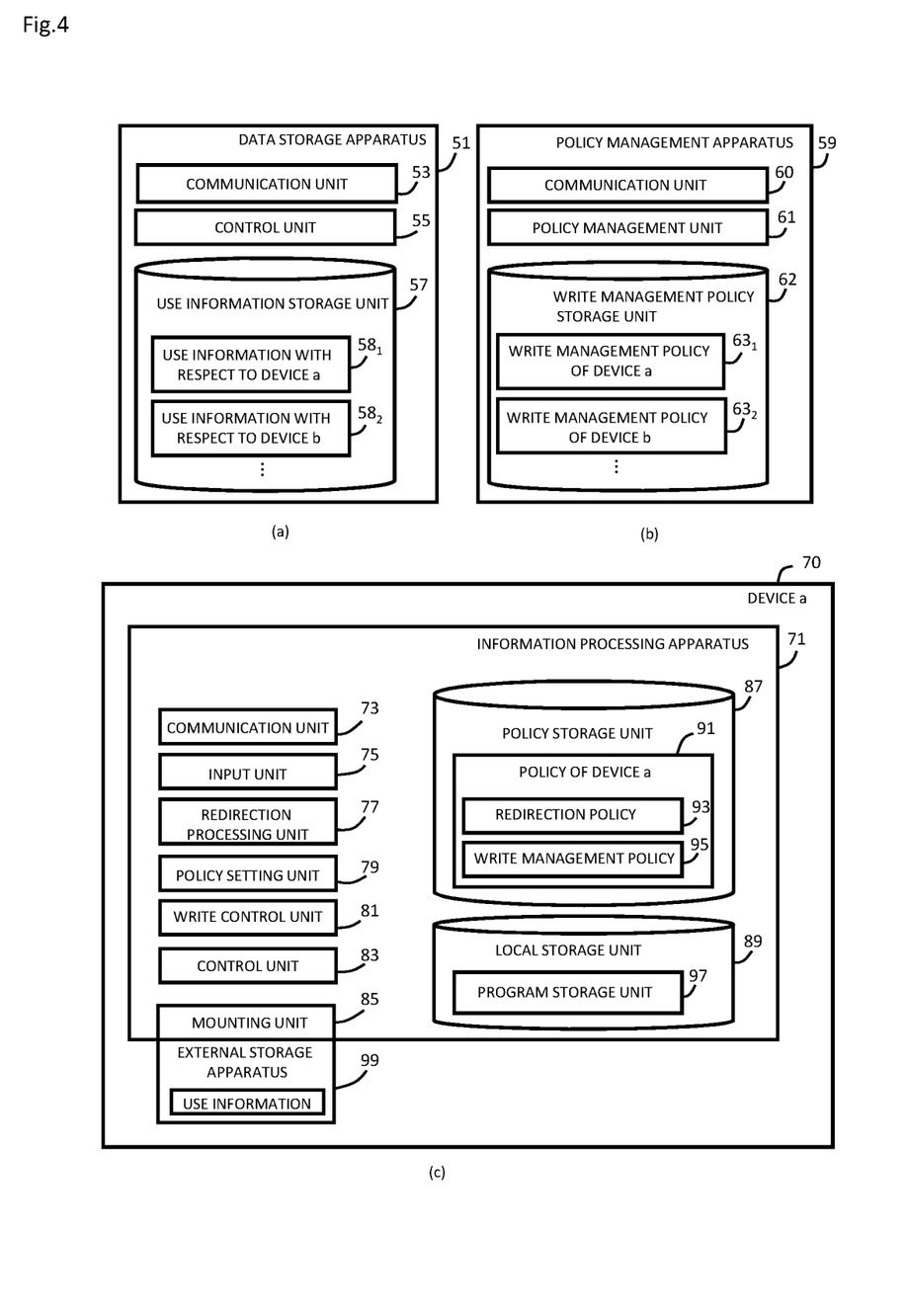
FIG. 4A is a block diagram showing an example configuration of a data storage apparatus 51 included in a data protection system according to another example of the present invention.
FIG. 4B is a block diagram showing an example configuration of a policy management apparatus 59 thereof.
FIG. 4C is a block diagram showing an example configuration of a device 70 thereof.
Figure 5:
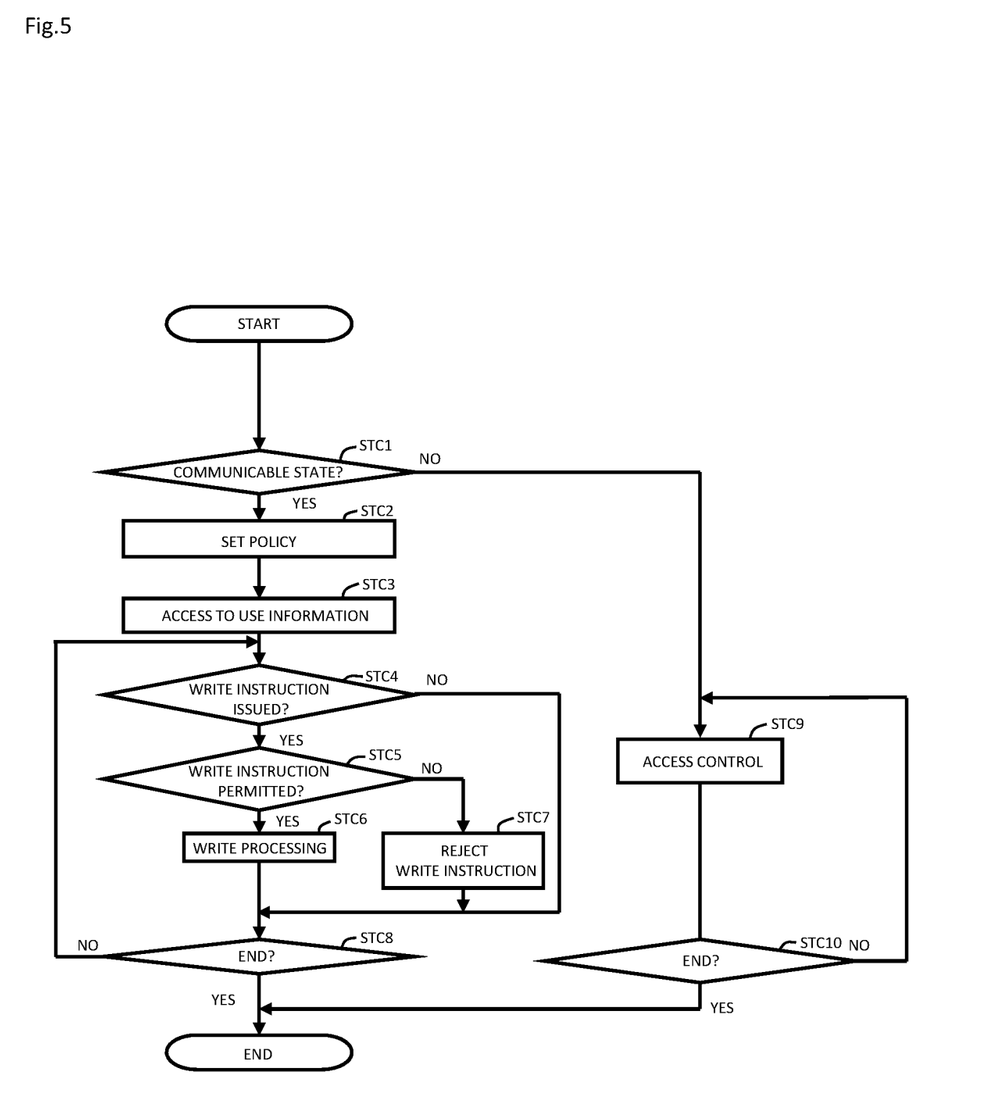
FIG. 5 is a flowchart showing an example of the operation of the data protection system shown in FIG. 4.

FIGS. 4 and 5 each show a data protection system configured as another example of the present invention, having a configuration in which an information processing apparatus is built into a device. In FIG. 4, an information processing apparatus 71 is built into a device a 70. A control unit 83 of the information processing apparatus 71 controls the operation of the device a 70. For example, in a case in which the device a 70 is configured as an air conditioner, the user A operates his/her smartphone so as to access the input unit 75. Subsequently, the user A inputs information such as a desired target room temperature. The information processing apparatus 71 controls the device a 70 based on the current room temperature and the target room temperature so as to heat or cool the room such that the room temperature matches the target room temperature.

FIG. 4A shows an example configuration of a data storage apparatus 51 included in a data protection system according to another example of the present invention. FIG. 4B shows an example configuration of a policy management apparatus 59 included in the data protection system. FIG. 4C shows an example configuration of the device a 70 included in the data protection system.

Referring to FIG. 4A, the data storage apparatus 51 includes a communication unit 53, a control unit 55, and a use information storage unit 57. The communication unit 53 and the control unit 55 each communicate with the information processing apparatus 71 so as to control the operation of the data storage apparatus 51.

The use information storage unit 57 manages use information 58 that corresponds to each device. Examples of the use information 58 include information input to the input unit 75 by the user of the device a 70, or information that can be used to identify the input information. For example, in a case in which the device a 70 is configured as an air conditioner, the user sets the target temperature via the input unit 75. The air conditioner adjusts the room temperature such that it matches the target temperature. The target temperature thus input is an example of the use information 58. In a case in which the device a 70 is configured as a program recorder, the user specifies a program to be recorded via the input unit 75. The device a 70 records the program thus specified. Information that can be used to identify the program thus specified is an example of the use information.

The communication unit 53 communicates with the information processing apparatus 71. Upon receiving a data read request and a data write request from the information processing apparatus 71, the control unit 55 reads and writes the use information that corresponds to the device including the information processing apparatus 71.

Referring to FIG. 4B, the policy management apparatus 59 includes a communication unit 60, a policy management unit 61, and a write management policy storage unit 62.

The write management policy storage unit 62 stores a write management policy 63 for each device, configured to specify multiple processes that are to be executed in the information processing apparatus 71 and that are permitted to write the use information and to specify a storage area to which the use information can be written.

The communication unit 60 communicates with the information processing apparatus 71. Examples of operations supported by the policy management unit 61 include management (addition, change, deletion, etc.) of the write management policy according to an instruction from the system manager, distribution of the write management policy to the information processing apparatus 71, and the like.

Referring to FIG. 4C, the device a 70 includes the information processing apparatus 71. The information processing apparatus 71 includes a communication unit 73, an input unit 75, a redirection processing unit 77, a policy setting unit 79, a write control unit 81, a control unit 83, a mounting unit 85, a policy storage unit 87, and a local storage unit 89. An external storage apparatus 99 is detachably mounted on the mounting unit 85 such that it can be easily detached. The local storage unit 89 includes a program storage unit 97 that stores programs that can be executed in the information processing apparatus 71.

The communication unit 73, the input unit 75, and the control unit 83 each communicate with the data storage apparatus 51 and the policy management apparatus 59. This arrangement allows operation by the user so as to input an instruction to change the user information or the like. Furthermore, this arrangement allows the programs stored in the program storage unit 97 to be executed or the like, so as to control the operations of the information processing apparatus 71 and the device a 70.

When the device a 70 is started up, the policy setting unit 79 sets a policy of the device a 70 for the policy storage unit 87. The policy includes a redirection policy 93 for accessing use information $58_1$ with respect to the device a, and a write management policy 95 for controlling data writing supported by the write control unit 81. The policy setting unit 79 downloads a write management policy $63_1$ of the device a managed by the write management policy storage unit 62, and overwrites the previous write management policy 95, thereby setting the write management policy 95. The write management policy 95 is designed employing the whitelist method so as to manage the device a 70, the processes permitted to perform data writing, and the storage area to which data can be written, such that they are associated with each other. Specifically, in a case in which a given process is included in the write management policy 95, the write control unit 81 permits the process to write data to the permitted storage area (e.g., the use information $58_1$ with respect to the device a and a part of or all of the local storage unit 89). Conversely, in a case in which a given process is not included in the write management policy 95, the write control unit 81 prohibits data writing to the local storage unit 89. For example, the write management policy 95 is designed such that it includes no process configured to write information that can be used to identify the user, and such that it includes processes each configured to write only data that occurs in ordinary processing.

With the information processing apparatus 71, the redirection processing unit 77 sets the use information $58_1$ with respect to the device a to an accessible state using the redirection policy 93. Furthermore, the write control unit 81 controls data writing to the use information $58_1$ and the storage area of the local storage unit 89 using the write management policy 95.

FIG. 5 is a flowchart showing an example of the operation of the data protection system shown in FIG. 4. Description will be made with reference to FIG. 5 regarding an example of the operation of the data protection system shown in FIG. 4.

When the device a 70 is started up, the policy setting unit 79 judges whether or not the communication unit 73 is able to communicate with the data storage apparatus 51 and the policy management apparatus 59 (Step STC1). When the communication is not be possible, the flow proceeds to Step STC9. When the communication is possible, the policy setting unit 79 sets the redirection policy 93 to be used for accessing the use information $58_1$ with respect to the device a, and downloads the write management policy $63_1$ for the device a stored in the write management policy storage unit 62 so as to set the management policy 95 (Step STC2). The redirection processing unit 77 uses the redirection policy 93 to set the information processing apparatus 71 to a state in which it is able to access the use information $58_1$ (Step STC3). The control unit 83 uses the program stored in the program storage unit 97 of the local storage unit 89 to read the use information $58_1$ with respect to the device a, so as to control the operation of the device a 70.

The write control unit 81 judges whether or not a given process has issued an instruction to write data (Step STC4). When judgment has been made that a process has issued an instruction to write data, the flow proceeds to Step STC5. Otherwise, the flow proceeds to Step STC8.

In Step STC5, the write control unit 81 judges whether or not the data writing instruction issued by the process matches an instruction by a process included in the write management policy 95 to perform data writing to the storage area to which data writing is permitted, and judges whether or not the data writing instruction issued by the process matches an instruction issued by a process that is not included in the write management policy 95 to write the use information $58_1$ with respect to the device a. When judgment has been made that the data writing instruction by a given process matches a data writing instruction issued by a process included in the write management policy 95 to write data to the storage area to which data writing is permitted, the data writing is performed. When judgment has been made that the data writing instruction by a given process matches a data writing instruction issued by a process that is not included in the write management policy 95 to write the use information $58_1$ with respect to the device a, use information writing is performed (Step STC6), following which the flow proceeds to Step STC8. When the data writing is not permitted, the writing processing is rejected (Step STC7), following which the flow proceeds to Step STC8. In Step STC8, the control unit 83 judges whether or not the user has issued an instruction to end the operation of the device a 70. When judgment has been made that the user has issued an operation end instruction, the control unit 83 ends the operation. Otherwise, the flow returns to Step STC4.

Step STC9 shows a step proceeding from Step STC1 in a situation in which the information processing apparatus 71 is not able to communicate with the data storage apparatus 51 and/or the policy management apparatus 59. The control unit 83 performs various operations, e.g., adds data required to execute the program to the local storage unit 89 and the external storage apparatus 99, changes the data, etc. For example, the write control unit 81 prohibits data writing to the local storage unit 89, and permits data writing to the external storage apparatus 99. This allows the device a 70 to be controlled without involving the personal information remaining in the local storage unit 89. In step STC10, the control unit 83 judges whether or not the user has issued an instruction to end the operation. When judgement is made that the user has issued an operation end instruction, the operation ends. Otherwise, the access control is continued in Step STC9.

As shown in FIGS. 4 and 5, the present invention is applicable to technical fields such as the IoT or the like. It is expected that various arrangements will be made in the future, examples of which include an arrangement in which a program storage apparatus configured to record a TV program or the like is controlled by an application installed on a user's own smartphone or the like, and the program storage apparatus operates according to the smartphone or the like configured as a controller. In this case, a program that has been recorded, played back, or the like by the program storage apparatus is a reflection of the user's private information. In a case in which the program storage apparatus storing such private information is discarded or is sold second-hand, this leads to the leakage of private information. With the present invention, in a case in which the program storage apparatus is able to communicate with a data storage apparatus, such private information is handled such that it does not remain in the local storage unit, thereby preventing the leakage of private information. In a case in which the program storage apparatus is not able to communicate with the data storage apparatus, such private information is stored in a detachable external storage apparatus, for example. When the program storage apparatus is to be discarded or the like, the user is only required to detach the external storage apparatus to prevent the leakage of private information. It should be noted that such private information may be stored in a predetermined data storage area of the local storage unit, for example. Such an arrangement only requires the user to delete the data stored in this storage area when it is sold second-hand. Such a storage area may be preferably encrypted. Recently, computer viruses or the like have been found in the IoT. However, it is difficult for each device to support a countermeasure. With the present invention, the write management policy supports the management of whether or not a given process is to be permitted to write data, thereby protecting private information from an abnormal operation. In a case in which the security level is to be raised, the write management policy may be preferably designed to support the management of the read operations of the processes.

It should be noted that, in FIGS. 4 and 5, the write control may be performed using the whitelist method alone, the blacklist method alone, or a combination thereof.

REFERENCE SIGNS LIST 1, 51 data storage apparatus, 3, 53 communication unit, 5, 55 control unit, 7 personal storage area storage unit, 8 personal storage area, 9, 59 policy management apparatus, 10 communication unit, 11, 61 policy management unit, 12, 62 write management policy storage unit, 13, 63 write management policy, 21, 71 information processing apparatus, 23, 73 communication unit, 25, 75 input unit, 27, 77 redirection processing unit, 29, 79 policy setting unit, 31, 81 write control unit, 33, 83 control unit, 35, 85 mounting unit, 37, 87 policy storage unit, 39, 89 local storage unit, 41, 91 policy, 43, 93 redirection policy, 45, 95 write management policy, 47, 97 program storage unit, 49, 99 external storage apparatus, 57 use information storage unit, 58 use information, 70 device a.

The invention claimed is:

1. An information processing apparatus comprising:
a redirection processing hardware unit;
a write control hardware unit; and
a local storage hardware unit,
wherein processes are executed in the information processing apparatus,
wherein, in a case in which the information processing apparatus is able to communicate with a data storage apparatus, the redirection processing hardware unit controls a first folder to access data stored in the data storage apparatus and controls a second folder to access data stored in the local storage hardware unit,
wherein, in this case, when a process has issued a data writing instruction,
if the process executes a data writing according to an instruction from a user, the write control hardware unit controls the process to permit writing data to the first folder and prohibit writing data to the second folder, and
if the process operates without involving an execution of the data writing according to the instruction from the user, the write control hardware unit controls the process to permit writing data to the first folder and the second folder, and
wherein, in a case in which the information processing apparatus is not able to communicate with the data storage apparatus, the first folder and the second folder access data stored in the local storage hardware unit,
wherein, in this case, when the process has issued the data writing instruction,
if the process executes the data writing according to the instruction from the user, the write control hardware unit controls the process to prohibit writing data to the first folder and the second folder, and
if the process operates without involving the execution of the data writing according to the instruction from the user, the write control hardware unit controls the process to permit writing data to the first folder and the second folder.

2. The information processing apparatus according to claim 1, further comprising a policy setting hardware unit configured to store a write management policy,
wherein, in a case in which the information processing apparatus is able to communicate with a policy management apparatus, the policy setting hardware unit downloads a write management policy managed in the policy management apparatus and the write control hardware unit performs a data writing control operation using the write management policy according to an instruction from the user, and
wherein, in a case in which the information processing apparatus is not able to communicate with the policy management apparatus, the policy setting hardware unit sets the write management policy and the write control hardware unit performs the data writing control operation using the write management policy according to the instruction from the user.

3. The information processing apparatus according to claim 1, wherein, in a case in which the information processing apparatus is not able to communicate with the data storage apparatus, the write control hardware unit permits a process executed in the information processing apparatus to write data to an external storage apparatus that differs from both the data storage apparatus and the local storage hardware unit.

4. The information processing apparatus according to claim 1, wherein the information processing apparatus is capable of accessing data stored in the local storage hardware unit using a local position representation,
wherein, in a case in which the information processing apparatus is able to communicate with the data storage apparatus, the redirection processing hardware unit allows the user of the information processing apparatus to access data stored in the data storage apparatus using a redirection position representation specified as a part of the local position representation,
wherein, in this case, when data writing is requested according to an instruction from the user of the information processing apparatus, the write control hardware unit permits such data to be written to a position specified in the data storage apparatus that is accessible using the redirection position representation, and prohibits such data from being written to a position specified in the local storage hardware unit that is accessible using a local position representation that is not specified as a redirection position representation, and wherein, in a case in which the information processing apparatus is not able to communicate with the data storage apparatus, when data writing is requested according to an instruction from the user of the information processing apparatus, the write control hardware unit prohibits such data from being written to a position specified in the local storage hardware unit that is accessible using the local position representation.

5. The information processing apparatus according to claim 2, wherein the write management policy is configured to manage the user of the information processing apparatus, processes for which data writing in the information processing apparatus is permitted and/or prohibited, and storage areas for which data writing is permitted and/or prohibited, such that they are associated with each other, and wherein, in a case in which the information processing apparatus is able to communicate with the data storage apparatus, the write control hardware unit controls so as to judge whether or not data writing is to be permitted or prohibited using the write management policy that corresponds to the user of the information processing apparatus based on information with respect to a combination of the user of the information processing apparatus, the process that is to write data, and the storage area to which the data is to be written.

6. A data protection method employed in an information processing apparatus, wherein the information processing apparatus comprises a redirection processing hardware unit, a write control hardware unit, and a local storage hardware unit, wherein processes are executed in the information processing apparatus, wherein, in a case in which the information processing apparatus is able to communicate with a data storage apparatus, the redirection processing hardware unit controls a first folder to access data stored in the data storage apparatus and controls a second folder to access data stored in the local storage hardware unit, wherein, in this case, when a process has issued a data writing instruction, if the process executes a data writing according to an instruction from a user, the write control hardware unit controls the process to permit writing data to the first folder and prohibit writing data to the second folder, and if the process operates without involving the execution of the data writing according to the instruction from the user, the write control hardware unit controls the process to permit writing data to the first folder and the second folder, and wherein, in a case in which the information processing apparatus is not able to communicate with the data storage apparatus, the first folder and the second folder access data stored in the local storage hardware unit, wherein, in this case, when the process has issued the data writing instruction, if the process executes the data writing according to the instruction from the user, the write control hardware unit controls the process to prohibit writing data to the first folder and the second folder, and if the process operates without involving the execution of the data writing according to the instruction from the user, the write control hardware unit controls the process to permit writing data to the first folder and the second folder.

7. A non-transitory computer-readable recording medium that records a program configured to cause a computer to function as the write control hardware unit in the information processing apparatus according to claim 1.

* * * * *